US005384102A

United States Patent [19]

Ferguson et al.

[11] Patent Number: 5,384,102

[45] Date of Patent: Jan. 24, 1995

[54] CHEMICAL FEEDER

[75] Inventors: Richard H. Ferguson, New Martinsville, W. Va.; Charles R. Wiedrich, Murrysville, Pa.

[73] Assignee: PPG Industries, Inc., Pittsburgh, Pa.

[21] Appl. No.: 98,680

[22] Filed: Jul. 28, 1993

[51] Int. Cl.$^6$ ........................ B01D 11/02; E04H 3/16; E03B 11/00; B65D 88/54

[52] U.S. Cl. .................................... 422/264; 422/261; 422/266; 422/272; 422/274; 422/277; 210/97; 210/169; 210/206; 137/268; 222/325

[58] Field of Search ............... 422/261, 263, 264, 265, 422/266, 272, 274, 275, 276, 277; 210/97, 169, 206, 754, 756; 137/268; 222/321, 325

[56] References Cited

U.S. PATENT DOCUMENTS

| | | | |
|---|---|---|---|
| 1,242,905 | 10/1917 | Atkinson | 422/274 |
| 1,321,037 | 11/1919 | Hedrick | 422/278 |
| 2,395,258 | 2/1946 | Drake | 422/261 |
| 2,704,241 | 3/1955 | Gannon | 422/261 |
| 3,107,156 | 10/1963 | Fredericks | 422/264 |
| 3,203,440 | 8/1965 | Schneider, Jr. | 422/264 |
| 3,383,178 | 5/1968 | Dietz | 23/272 |
| 3,385,674 | 5/1968 | Kolasinski | 422/278 |
| 3,426,901 | 2/1969 | Sherper | 210/206 |
| 3,474,817 | 10/1969 | Bates et al. | 210/206 |
| 3,507,624 | 4/1970 | Schneider, Jr. | 422/264 |
| 3,579,440 | 5/1971 | Bradley, Jr. | 210/206 |
| 3,595,395 | 7/1971 | Lorenzen | 210/169 |
| 3,595,786 | 7/1971 | Horvath et al. | 422/264 B |
| 3,598,536 | 9/1971 | Christensen | 422/274 |
| 3,846,078 | 11/1974 | Brett | 422/264 |
| 3,864,090 | 2/1975 | Richards | 422/278 |
| 3,899,425 | 8/1975 | Lewis | 210/206 |
| 4,063,663 | 12/1977 | Larson et al. | 422/264 |
| 4,210,624 | 7/1980 | Price | 422/264 |
| 4,293,425 | 10/1981 | Price | 210/754 |
| 4,331,174 | 5/1982 | King | 422/277 |
| 4,379,125 | 4/1983 | Benninger et al. | 422/274 |
| 4,407,322 | 10/1983 | Moore et al. | 422/276 |
| 4,548,228 | 10/1985 | Moore et al. | 422/276 |
| 4,584,106 | 4/1986 | Held | 210/206 |
| 4,732,689 | 3/1988 | Harvey et al. | 210/754 |
| 4,759,907 | 7/1988 | Kowalics et al. | 422/264 |
| 4,790,981 | 12/1988 | Mayer et al. | 422/264 |
| 4,816,222 | 3/1989 | Fagrell | 422/261 |
| 4,867,196 | 9/1989 | Zetena et al. | 137/268 |
| 4,917,868 | 4/1990 | Alexander et al. | 422/276 |
| 5,007,559 | 4/1991 | Young | 422/267 |
| 5,089,127 | 2/1992 | Junker et al. | 210/206 |

OTHER PUBLICATIONS

Olin Pulsar ®, Olin Chemicals.

S-2 Automatic $Cl_2$ Feeder for In-ground Pools, by E. Z. Chlor ® Systems.

Pulsar ® II, Olin Water Products and Services Division, Olin Corporation.

*Primary Examiner*—Robert J. Warden

*Assistant Examiner*—Christopher Y. Kim

*Attorney, Agent, or Firm*—Irwin M. Stein

[57] ABSTRACT

An apparatus for dissolving a solid chemical material including a housing having a base and sidewalls that define a cavity within which is seated a container that is spaced from the housing sidewalls and covered with a grid is described. A flange connects the upper end of the housing sidewall to the container sidewall above the grid. A plurality of arrayed openings in the container sidewall above the grid and below the flange level leads to an annular collection zone in the housing. An outlet discharge pipe is connected to the collection zone and an inlet pipe for charging dissolving liquid communicates with the container below the grid.

19 Claims, 4 Drawing Sheets

CHEMICAL FEEDER

DESCRIPTION OF THE INVENTION

The present invention is directed generally to apparatus for dissolving a solid chemical material in a liquid in which the chemical is soluble. More particularly, the present invention concerns a chemical feeder for delivering an aqueous solution of a chemical material, e.g., nutrient chemicals, sanitizing chemicals, dechlorination chemicals, and pH control chemicals, to a location, e.g., a large body of water, to which it is to be dispensed. Still more particularly, the present invention is directed to a chemical feeder that automatically dispenses controlled amounts of an aqueous solution of sanitizing chemical, e.g., calcium hypochlorite, in a reliable, efficient and cost effective manner for treatment of water systems. In a method of operating the chemical feeder of the present invention, the liquid solvent, e.g., water, is brought into controlled contact with a solid form of the chemical material in a dissolving zone such that it is dissolved in the liquid in a controlled manner. Thereafter, the resulting solution of solid chemical material is removed from the dissolving zone, forwarded to a collection zone within the apparatus, and subsequently removed from the collection zone and the apparatus and dispensed into the liquid system to be treated.

Chemical feeders used in previous forced flow or circulation systems have certain common features. Some typically have a chamber in which dissolving of the solid chemical occurs, and a chemical retainer in which the solid chemical is placed. The dissolving liquid, normally water, is typically fed into the dissolving chamber by some controlled means to ensure that the proper amount of chemical is dissolved.

U.S. Pat. No. 5,089,127 describes a chemical feed apparatus for dispensing a solid sanitizing agent, such as calcium hypochlorite, into a closed water circulation system, such as a flow loop for swimming pools. This apparatus provides an arrangement of parts including a canister containing tablets of a solid chemical sanitizing material, the lower portion of which is located in a cup-like dissolving reservoir. The lower portion and bottom of the canister is perforated to allow contact between water and the solid chemical sanitizing material. The solution of sanitizing material flows over the rim of the cup-like dissolving reservoir into a collection chamber from whence the solution is dispensed.

While the chemical feeder described in U.S. Pat. No. 5,089,127 provides an effective continuous feed of sanitizing agent, e.g., calcium hypochlorite, to bodies of water, e.g., swimming pools, for an extended period of unattended operation, the volume of water that may be treated for that period of unattended operation is limited by the number of sanitizing chemical tablets with which the canister may be filled. For example, a 20,000–40,000 gallon (75.7–151.4 $m^3$) swimming pool may be treated for a week or more by the chemical feed apparatus described in U.S. Pat. No. 5,089,127 without the addition of additional tablets of sanitizing material to the feeder. However, for larger bodies of water and water systems requiring the continuous addition of a sanitizing chemical over prolonged periods, e.g., water treatment plants, potable water supplies, industrial waste water, runoff water, water systems for cooling towers, and the like, a modified chemical feeder is required if frequent recharging of the canister with tablets of solid sanitizing agent is to be avoided.

In accordance with the foregoing requirements and pursuant to the present invention, there is provided an apparatus comprising housing having a base member and upwardly extending side walls. The base member and side walls define a cavity within which is placed an elongated substantially vertical hollow container. The container has side walls which are affixed to said base member and which may extend above the upper terminus of the side walls of the housing. The side walls of the container are spaced from the side walls of the housing, thereby forming an annular space between the inside wall of the housing and the outside wall of the container. Flange or plate means is connected to and extends from the upper terminus of the side walls of the housing to (i) the outside side walls of the container, or (ii) to the upper terminus of the side walls of the container, to which it is secured, thereby defining a collection chamber between said container and housing. In one embodiment, a cap or cover is placed over the container. In a further embodiment, a cap or cover having a diameter equal to the housing is placed over both the container and housing when the sidewalls of the container and housing are of equal height. In this further embodiment, the plate means is eliminated since the cap replaces the plate.

A grid having a plurality of perforations is mounted within the container below the level of the plate means or the cap substantially parallel to and spaced from the base member, thereby dividing the container into an upper storage chamber and a lower chamber. The edges of the grid may be in close proximity to the side walls of said container, i.e., close to but spaced slightly from the side walls of the container to permit installation of the grid within the container. The section of the side walls of the container located between the plate means or cap and the grid have a plurality of radially arrayed openings that permit liquid communication between the major upper storage chamber and the collection chamber. Means, e.g., piping means, is provided for delivering liquid, e.g., water, to the lower chamber of the container, and means, e.g., piping means, is provided additionally to remove liquid from the collection chamber.

The features that characterize the present invention are pointed out with particularity in the claims which are annexed to and form a part of this disclosure. Those and other features or the invention, its operating advantages and the specific objects obtained by its use will be more fully understood from the following detailed description and the accompanying drawings in which preferred embodiments of the invention are illustrated and described, and in which like reference characters designate corresponding parts.

DETAILED DESCRIPTION OF THE INVENTION

Figure 2:
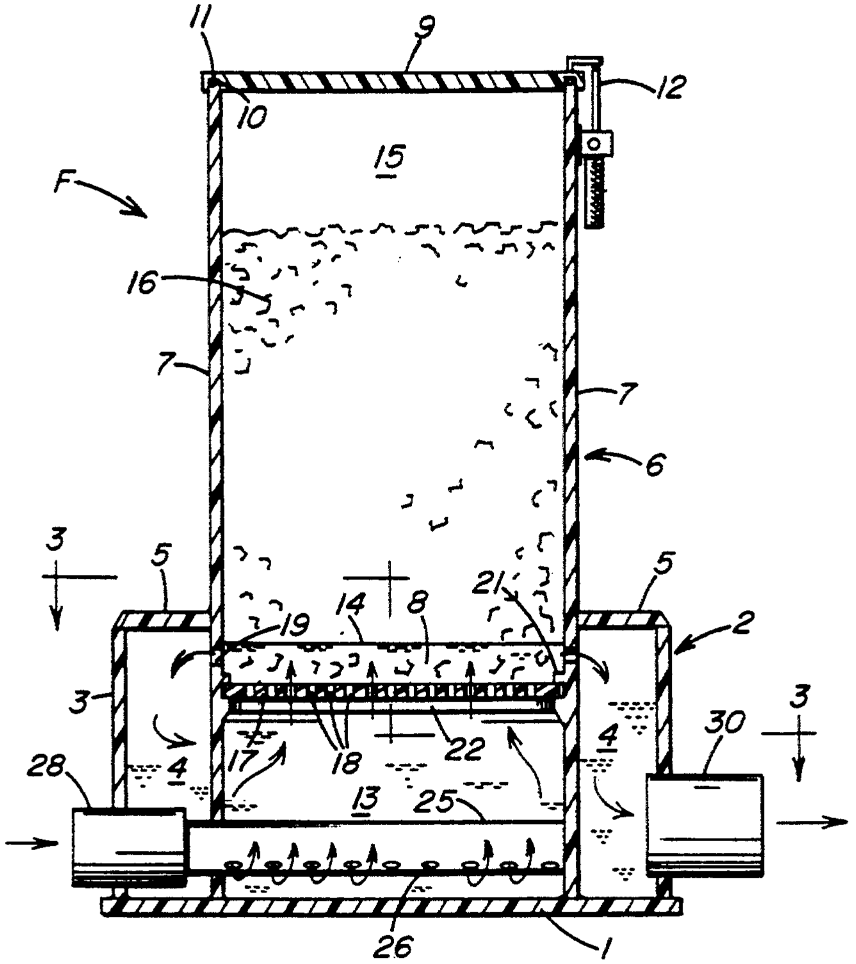
FIG. 2 is an elevation view, partially in section, of the chemical feeder of FIG. 1.
Figure 3:
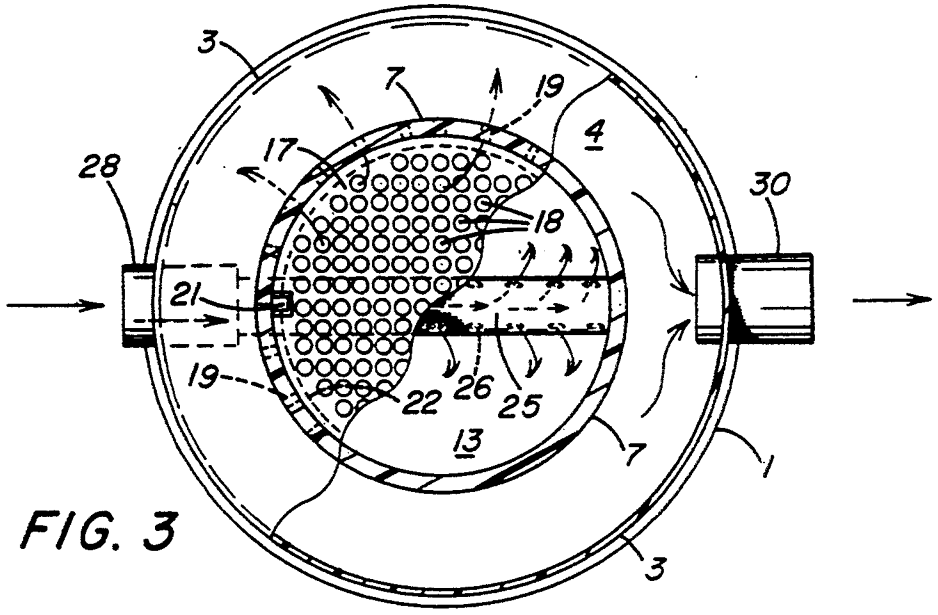
FIG. 3 is a top plan view of the chemical feeder of FIG. 2 through section line 3–3.

Referring now to FIG. 2 of the drawings, the feeder F comprises a housing 2 having a base member 1 and upwardly extending side walls 3. As shown, side walls 3 of housing 2 are substantially vertical and perpendicular to base member 1. While the housing may be of any appropriate geometric shape, e.g., cylindrical or square shaped, side walls 3 and base member 1 typically define a cavity which, in the embodiment of FIG. 2, may be characterized as a hollow truncated cylinder or as simply a hollow cylinder in the embodiment of FIGS. 7 and 8. Within the cavity of housing 2 is an elongated substantially vertical hollow container 6 having side walls 7, which are affixed to base member 1 and which in the embodiment of FIG. 2 extend above the upper terminus of side walls 3 of housing 2. Side walls 7 of container 6 are spaced from side walls 3 of housing 2, thereby to define an annular cavity identified herein as collection chamber 4. While the vertical hollow container 6 may be of any appropriate geometric shape, it is typically cylindrical in shape and coaxial with housing 2, when it also is cylindrical.

The upper end of housing 2 is covered with plate or flange means 5, which connects the upper terminus of side wall 3 to the container, e.g., the plate means, is secured to and extends from the upper terminus of side walls 3 of housing 2 to the outside of side walls 7 of container 6, to which plate means 5 is also attached. In accordance with a preferred embodiment of the present invention, plate means 5 is a donut-shaped member substantially parallel to base member 1. Plate means 5, side walls 3 and 7, and base member 1 define an enclosed annular chamber surrounding the bottom portion of cylinder 6, i.e., lower chamber 13 and the lower portion of the major storage chamber 15.

Figure 7:
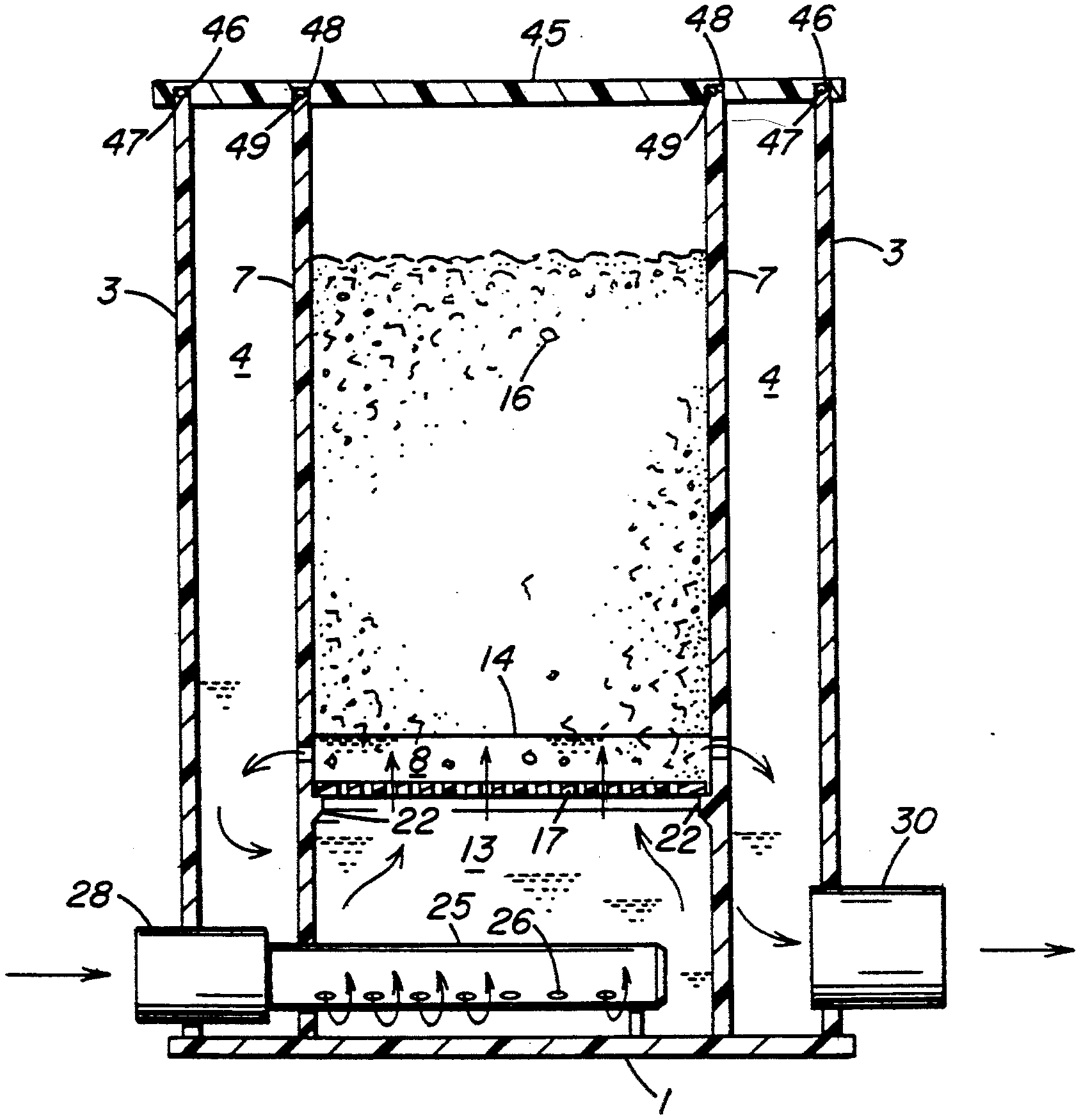
FIG. 7 is an elevation view partially in section of an embodiment of the present invention wherein the side walls of the housing and container are of equal height, a common cap covers the housing and container and the means for delivering liquid to the lower chamber is as illustrated in FIG. 6.
Figure 8:
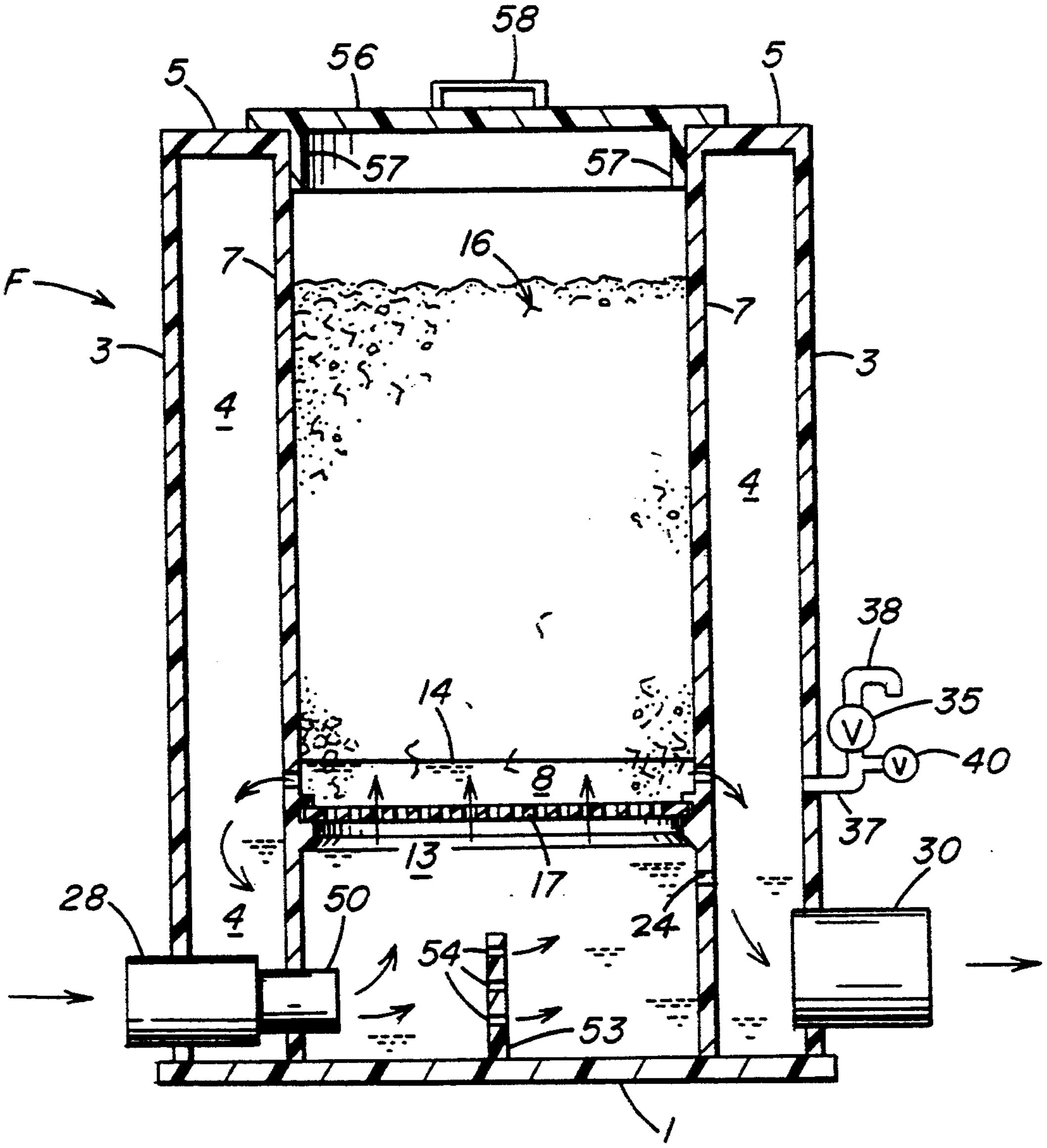
FIG. 8 is an elevation view partially in section of an embodiment of the present invention wherein the side walls of the housing and container are of equal height, flange means extends from the upper terminus of the housing side wall to the upper terminus of the side wall of the container, a cover with a handle covers the container, and a further embodiment for delivering liquid to the lower chamber in which a baffle is positioned to distribute the incoming fluid are illustrated.

In the embodiment of FIG. 7, no flange or plate means are used. As described hereinafter, a common cover 45 is used to enclose both the collection chamber 4 and the upper chamber 15 of container 6. In the embodiment of FIG. 8, plate means 5 extends from the upper terminus of side wall 3 to the upper terminus of side wall 7, and a cap 56 is used to cover the upper chamber 15.

Referring again to FIG. 2, the upper end of container 6 is covered with removable lid 9. As shown, lid 9 has an annular channel 10 near the outside edge of lid 9 which is sized to be slightly larger than the thickness of side wall 7 so as to fit over the top of side wall 7 of container 6. An O-ring 11 is located in annular channel 10 so that when the lid is placed on top of container 6 and forced downwardly by latches 12, the interior of upper chamber 15 of cylinder 6 is sealed against the entry of contaminants and the outside air. Lid 9 may be secured in place by means of hinged latches 12, which when in place provide an airtight seal between the lid and the upper terminus of side walls 7. Although only one latch 12 is shown in FIG. 2, at least two such latches are contemplated, i.e., two latches 180° apart. Three or four (or more) latches may be used and are equally spaced around top 9 and cylinder 6, i.e., spaced 120° or 90° apart.

While the use of a top secured by latches is shown, it is clear that other means of attachment, such as a threaded cap, may be used. Since the feeder may be operated with a negative pressure in chamber 15, it generally is not necessary to secure lid 9 to cylinder 6, except as a safety measure to prevent unauthorized or accidental entry.

Referring to FIG. 7, cover 45 covers both the collection chamber 4 and the upper storage chamber 15. The cover has annular channels 46 and 48 sized to be slightly larger than the thickness of side walls 3 and 7 respectively so as to fit over the top of said side walls. Annular channels 46 and 48 contain O-rings 47 and 49 respectively so that when lid 45 is put in place and forced downwardly by a latch, e.g., such as by a latch as latch 12, the interior of the collection zone 4 and upper chamber 15 are sealed against the outside air and the entry of contaminants.

Referring to FIG. 8, cover 56 is shown with handle 58 and an annular leg 57 that fits closely against the inside side wall 7 of container 6. Annular leg 57 need not be continuous, but may comprise a plurality of legs extending downwardly from the bottom of cover 56 to keep cover 56 in place during operation of the feeder.

Grid 17 in the form of a plate having a plurality of perforations 18 is mounted in close proximity to the inside side wall of container 6 below the level of plate means 5 and is spaced from and substantially parallel to base member 1. As shown, the grid is mounted in said container below the midpoint of the vertical axis of said container, thereby dividing the container into a major upper storage chamber 15 for the storage of solid sanitizing agent 16, and a minor lower chamber 13. As shown in more detail in FIG. 4, grid 17 is a circular plate having two notches 20 cut out of opposite edges of the plate. While two notches are shown, more, e.g., three, four or more, may be used. In a further embodiment, as explained herein, grid 17 may have no notches.

Grid 17, as shown, is in close proximity to the inside side wall of container 6, e.g., it has a diameter slightly smaller than the inside diameter of container 6. In positioning grid 17 within container 6, grid 17 may be lowered into empty chamber 15 with notches 20 at the outer edge of grid 17 aligned with tabs 21, which are attached to the inside side wall of container 6 below the openings or orifices 19 in side wall 7. Below tabs 21 are ledges or lips 22, which extend horizontally away from side wall 7 toward the center of the container and which are spaced below tab 21 a distance slightly larger than the thickness of grid 17. To prevent movement of grid 17 during operation, the grid may be rotated slightly so that notch 20 is horizontally displaced from tab 21, thereby locking grid 17 between tabs 21 and lips 22. The number of tabs 21 will equal the number of notches 20 in grid 17 and is at least equal to the number of lips 22.

Lip 22 may be a plurality of lips or one continuous lip around the inside circumference of cylinder 6. The lip should be sufficient to support the weight of the grid and the weight of the solid chemical material 16 placed in the upper storage chamber 15. In one embodiment, the lip is an annular lip 0.5 inches (1.27 cm) deep and 0.5 inches (1.27 cm) high attached to the inside wall 7 of container 6 around the entire inner circumference of container 6.

In an embodiment where no notches and no tabs are used, grid 17 rests on lips 22, which may take the form of an annular ledge around the inside circumference of container 6, or a segmented annular ledge, i.e., a series of separate horizontal arcuate ledges around the inside circumference of container 6. It is contemplated in this embodiment that the weight of the solid chemical material 16 will be sufficient to retain grid 17 in place—at least until the chemical material is substantially depleted.

While grid 17 is shown as removably attached to the inside of side wall 7 of container 6, it may be permanently hung or fastened to the inside of side wall 7 by conventional brackets, screws or heat welded to lip 22. In addition, grid 17 may be vertically adjustable within chamber 13 by providing a series of vertical locator holes on the inside side wall of container 6. It is contemplated that at least three series of vertical locator holes, e.g., spaced 120° apart, will be used. A dowel to which a horizontal bracket is attached may be inserted in locator holes positioned on the same horizontal level and the grid 17 supported on such brackets. In a further contemplated embodiment, the edge of grid 17 may be threaded to match with a threaded lip on the inside side wall of wall 7. In this embodiment, grid 17 may be lowered into chamber 15 until it engages the threads of the lip on the inside wall 7 and then screwed downwardly until the top of grid 17 is the desired distance below openings 19. In a still further embodiment, notches 20 may be equal in width and length to a plurality of rows of vertically separated segmented arcuate lips arrayed horizontally and on the same plane around the circumference of the inside of side wall 7. In this manner, the grid can be lowered until it reaches the desired distance below openings 19, and then rotated to fix the grid on top of one row of the segmented horizontal planar lips.

Referring again to FIG. 2, side walls 7 of container 6 have a plurality of radially arrayed openings or orifices 19 positioned between the lowermost point of attachment of plate means 5 to side wall 7 and the top of grid 17. These openings permit liquid communication between upper chamber 15 and collection chamber 4. When, as shown in FIG. 7, side walls 3 of housing 2 extend upwardly to, for example, a height equal to that of side walls 7, openings 19 are radially arrayed a preselected distance above grid 17 so as to provide a predetermined height of dissolving liquid, e.g., water, within chamber 15. As shown in FIGS. 2, 7 and 8, reference number 14 represents the water level within chamber 15. The number and size of openings 19 are designed to maintain the predetermined height of dissolving liquid in chamber 15, i.e., the volume of dissolving zone 8, substantially constant over the selected range of flow rates for the dissolving liquid so as to maintain the surface area of solid chemical 16 in contact with the dissolving liquid in the dissolving zone substantially constant. Alternatively, the number and size of openings 19 may be selected to have the dissolving zone 8 increase in volume with increasing flow rates of dissolving liquid. Openings 19 may in the case of FIGS. 7 and 8 be higher in side wall 7 than as shown, which would raise the water level 14 within chamber 15 and increase the volume of dissolving zone 8, thereby increasing the volume of solid chemical 16 in contact with the dissolving liquid.

Means to deliver liquid to chamber 13 are provided by an inlet conduit 28 and pipe 25 which, in combination, are shown extending through one side of side wall 3 of housing 2 and side wall 7 of container 6. Inlet pipe 25 is shown as extending to and affixed to the opposite inside wall 7 of container 6 and as having a plurality of orifices 26, i.e., in the form of sparger pipe, to allow the passage of liquid, e.g., water, from its source (not shown) into lower chamber 13. Orifices 26 are shown facing downwardly toward base member 1. In one contemplated embodiment, pipe 25 has two rows of orifices 26 each offset 15 degrees from the vertical, i.e., so that the rows are 30° apart. Such an arrangement allows the incoming fluid from inlet pipe 25 to flow into chamber 13 toward base member 1, whereupon it rises through chamber 13 and passes substantially uniformly through the perforations 18 in grid 17. While distribution means in the form of a sparger pipe is shown, any means of dispersing liquid within chamber 13 may be used.

Figure 6:
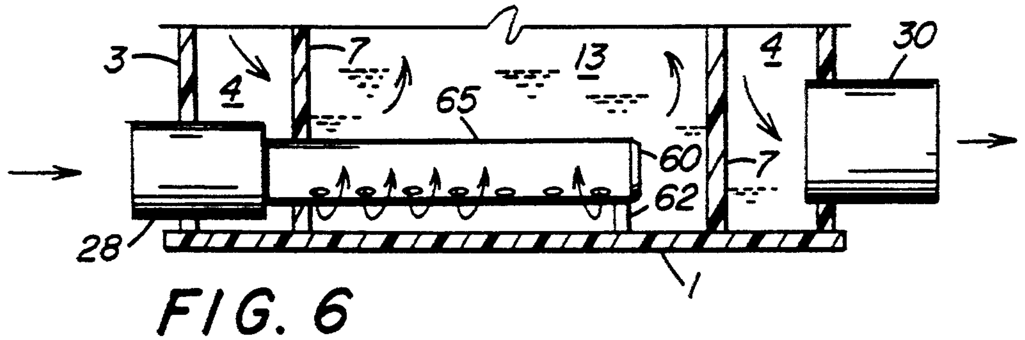
FIG. 6 is an elevation view, partially in section, of the lower portion of FIG. 7, illustrating a further embodiment of pipe means for delivering liquid to the lower inner chamber of the feeder.

It will be appreciated by those skilled in the art that inlet pipe 25 need not extend to, or be fixed to, the opposite inside side wall 7 of container 6; but as shown in FIG. 6, inlet pipe 65 may terminate before reaching the opposite inside wall 7 and may be covered with a cap 60. The distal end of inlet pipe 65 may be supported by leg 62 which rests upon base member 1. Leg 62 may be in the form of a saddle attached to the bottom and sides of pipe 65. Alternatively, the cap 60 and leg 62 may be the same part, i.e., a cap and saddle support means.

Additionally, as shown in FIG. 8, the means to deliver liquid to the lower chamber 13 may comprise an inlet conduit 28 and open ended pipe 50. The liquid from pipe 50 may be discharged against and/or through baffle means 53 so as to more evenly distribute the liquid within chamber 13, thereby providing a more even flow of liquid upwardly through grid 17, and permitting substantially uniform dissolution of sanitizing agent 16 along the top surface of grid 17 and in the dissolving zone 8 above the grid 17. Openings 54 in baffle means 53 permit liquid to flow through baffle means 53.

The purpose of baffle means 53 is to more evenly distribute liquid entering chamber 13 within that chamber to obtain substantially uniform fluid flow upwardly through grid 17, thereby to provide substantially uniform dissolution of the solid chemical material 16 within dissolving zone 8. Baffle means 53 may be one or more baffles, may extend across the entire diameter or width of chamber 13, as shown in FIG. 8, or extend only partially across the width of the chamber, i.e., be placed in the path of the incoming liquid entering from pipe 50. The height of baffle 53 is such that the top of the baffle is slightly higher than the top surface of inlet pipe 50. Baffle means 53 may be solid, have a series of small openings 54, as shown in FIG. 8, or have other larger openings, e.g., triangular or rectangular openings in the baffle, to permit the flow of liquid through the baffle. The means for using baffles to distribute fluid within a chamber from an inlet conduit is known in the art and need not be described in detail herein.

Liquid flowing upwardly through grid 17 dissolves the solid chemical material 16 in a dissolving zone 8 generally occupying a volume defined by the area of grid 17 and a height equal to the distance from the top of grid 17 to the openings 19 in side wall 7. The resulting solution of chemical 16 passes through openings 19 in side wall 7 into collection chamber 4 and is subsequently removed from collection chamber 4 through outlet conduit 30. Openings 19 are typically spaced evenly around the circumference of side wall 7. The number of openings and their size (diameter) will be such as to accommodate the maximum contemplated flow of liquid into chamber 13 and through grid 17, thereby to avoid a build-up of solution in chamber 15 significantly above openings 19. While one exit conduit 30 is shown, there may be additional exit conduits provided in housing 2 to allow for the removal of additional chemical solution or to provide for access to chamber 13 for ease of installing piping or to provide for multiple different applications of the chemical solution.

In order to prevent over pressurization of the feeder, there is provided, as shown in FIG. 8, check valve 35, e.g., a ball check valve, in communication with the atmosphere within the feeder. As illustrated, the check valve is connected to collection chamber 4 by means of hollow elbow 37. Check valve 35 is also connected to inverted hollow U-tube 38. The feeder may be operated at atmospheric or subtmospheric pressures. A vacuum relief valve 40 may also be provided in connection with the atmosphere within the feeder. As shown, it is connected to elbow 37 to provide means for releasing vacuum within the feeder F (when it is operated under vacuum) so that top 56 may be removed. The valve arrangement illustrated in FIG. 8 is also used in the embodiment of FIGS. 2 and 7.

In operation and with particular reference to FIG. 2, upper chamber 15 is filled with solid chemical material 16, e.g., sanitizing agent such as calcium hypochlorite pellets, tablets or the like. The size of the solid chemical material 16 will be sufficiently large to bridge the perforations 18 in grid 17, e.g., from about 0.375 inch (0.95 cm) to 5 inches (12.7 cm), e.g., 1 inch (2.54 cm) to 3 inches (7.62 cm). Solid chemical 16 that may fall through perforations 18 into chamber 13, either because of their original size or because they become too small due to erosion, will be dissolved by the liquid in chamber 13 and the resulting solution will ultimately pass upwardly through grid 17 and out into the collection chamber 4. Typically, chamber 15 may be sized to hold from about 20 pounds (9.1 kg) to about 2000 pounds (907 kg) of chemical material 16, preferably from about 20 to 150 pounds (9.1 to 68 kg). The liquid to be treated, usually a side stream from a main liquid, e.g., water, flow loop, is forwarded to inlet conduit 28 of the feeder. The rate of flow into conduit 28 is regulated by valve means (not shown) in piping connected to inlet conduit 28. Liquid, usually water, flows into inlet pipe 25 and exits through orifices 26 into chamber 13. The liquid rises through and fills chamber 13 and subsequently passes through grid 17 by means of perforations 18 in the grid and contacts sanitizing agent 16. Liquid rises in chamber 15 to a height defined by dissolving zone 8. The chemical material, e.g., sanitizing agent, is dissolved in the liquid and the resulting solution passes out of chamber 15 through arrayed openings 19 into collection chamber 4. The level of water in chamber 15 may be increased (and hence the amount of sanitizing agent dissolved increased) by lowering grid 17 within chamber 13 or raising the level of openings 19. The solution of solid chemical material in collection chamber 4 is withdrawn through exit conduit 30 and returned to the main flow loop of the dissolving liquid.

The feeder works on the principle of constant contact between the solid chemical material and the dissolving liquid in a dissolving zone comprising the liquid volume above the grid 17. The amount of chemical material delivered to the liquid is varied by controlling the flow rate of inlet liquid that contacts and dissolves the chemical material within the dissolving zone and the volume of liquid in contact with the chemical material in the dissolving zone. As the lowermost solid sanitizing agent in the dissolving zone is dissipated, additional sanitizing agent moves in a downward direction under the influence of gravity onto the perforated grid 17. When no dissolving liquid is delivered to the feeder or the delivery is stopped, no dissolution of the chemical material occurs since there is then no contact between the solid chemical and the dissolving liquid—any liquid in the dissolving zone having fallen into the lower chamber 13 when delivery of liquid to chamber 13 is stopped.

If a solenoid valve is used in the dissolving liquid feed line, it is possible for the level of dissolving liquid to remain in the dissolving zone, e.g., at the same level as during operation of the feeder. In that case, as shown in FIG. 8, a small opening 24 is provided in the side wall 7 of container 6 surrounding lower chamber 13 to allow fluid communicaiton between collection chamber 4 and lower chamber 13, thereby to permit equalization of pressure within feeder 4 and the dissolving liquid in the dissolving zone to drain into lower chamber 13.

The feeder is relatively inexpensive to construct and maintain since it has no moving parts other than the inlet valve which can be any valve capable of regulating the flow of liquid between about 0 and about 200 gallons per minute (0–0.76 $m^3$/min), e.g., 0.5 or 5 to 100 gallons per minute (0.0019 or 0.019 to 0.38 $m^3$/min), and the check and vacuum relief valves. The feeder and valves may be fabricated from any suitable material that is chemically and corrosion resistant to the chemical material, such as for example, polyethylene, ABS (acrylonitrile-butadiene-styrene resin), fiberglass reinforced resins, polystyrene, polypropylene, or poly(vinyl chloride), chlorinated poly(vinyl chloride) or any other material that is chemically resistant to the solid chemical being dispensed, e.g., a sanitizing agent such as calcium hypochlorite. Other materials such as stainless steel may also be used, but the use of such material would result in a substantial increase in cost. In a preferred embodiment, the feeder is fabricated from poly(-vinyl chloride) (PVC), which is generally chemically resistant to water sanitizing chemicals, such as calcium hypochlorite. Plastic parts of the feeder may be made by injection or rotation molding.

When constructed of plastic resin material, the various parts of the feeder may be joined by solvent or heat welding or by threading. The inlet and outlet conduits may also be joined to the feeder by the use of conventional bulkhead fittings. If a metal, such as stainless steel is used, conventional welding of the parts may be used to fabricate the feeder. Alternatively, the parts of the feeder may be joined by conventional threaded bolts and appropriate gasketing to insure that the feeder is water-tight.

The solid chemical material that may be used with the feeder may be any chemical that is solid at ambient conditions of temperature and pressure (STP), which may be formed into pellets or tablets, and which is readily soluble in a flowing liquid, e.g., water, at STP conditions. Examples of such chemicals can be nutrients, e.g., fertilizers; sanitizing agents, e.g., chemicals that sanitize water, such as for example, calcium hypochlorite, bromo-chloro hydantoin, dichlorohydantoin and chloroisocyanurates; desanitizing (dechlorination) agents such as sodium sulfite, sodium metabisulfite, sodium bisulfite, sodium thiosulfate, sodium sulfhydrate (NaSH), and sodium sulfide ($Na_2S$); and pH control agents such as sodium bisulfate, citric acid, sodium carbonate, sodium bicarbonate and quaternary ammonium compounds, some of which may be used also as algaecides.

It will be readily appreciated by those skilled in the art that the feeder of the present invention can be integrated into liquid, e.g., water, treatment facilities by appropriate piping connected with the inlet conduit 28 and exit conduit 30. The feeder may be integrated into an open or closed system. For example, inlet conduit 28 may be connected to a by-pass line of a main liquid, e.g., water, conduit by appropriate piping, thereby providing a source of liquid for treatment. The solution of chemical material removed through exit conduit 30 is forwarded by appropriate piping to the main liquid conduit downstream of the by-pass line connection. Alternatively, if the fluid flow in the main liquid conduit can be handled directly by the feeder, the feeder may be connected in-line with the main liquid conduit.

In another embodiment, the feeder may be installed in a closed system wherein the by-pass line from the main liquid conduit is connected by appropriate piping to the discharge side of a suitable pump. For example, the feeder may be used to treat swimming pool water by charging water discharged from the pool to the suction side of a pump. A by-pass flow line is connected to the main flow line connected to the discharge side of the pump and feeds water to the inlet conduit 28 of feeder F. The aqueous solution of sanitizing agent removed through exit conduit 30 is forwarded to the main flow line on the suction side of the pump. Chemically treated water passes through the pump and is forwarded to the swimming pool where it mixes with the main body of water in the pool. The amount of chemically treated water recirculated to the feeder through the by-pass line on the pressure (discharge) side of the pump is minimal because of dilution in the main feed line, and has no effect on the operation of the overall system because the rate and volume of water passing through the feeder prevents the water from becoming saturated with the chemical sanitizing agent.

The present invention is more particularly described in the following examples, which are intended as illustrative only, since numerous modifications and variations therein will be apparent to those skilled in the art.

EXAMPLE

Figure 1:
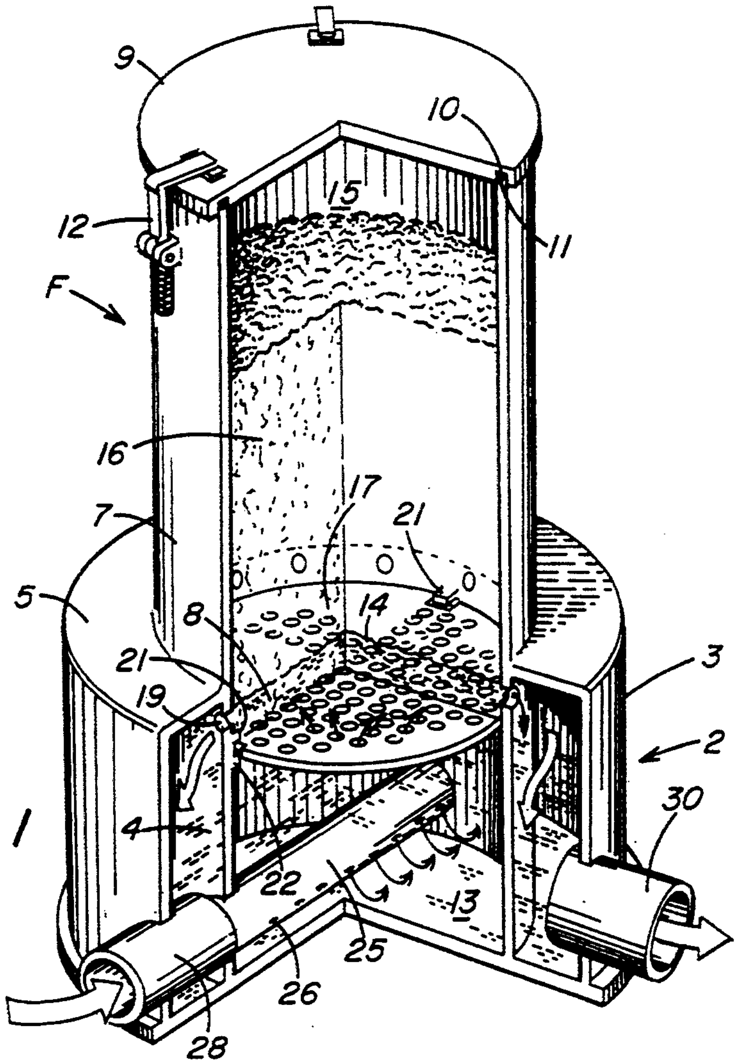
FIG. 1 is a partially cut away isometric view of an embodiment of the chemical feeder of the present invention.
Figure 4:
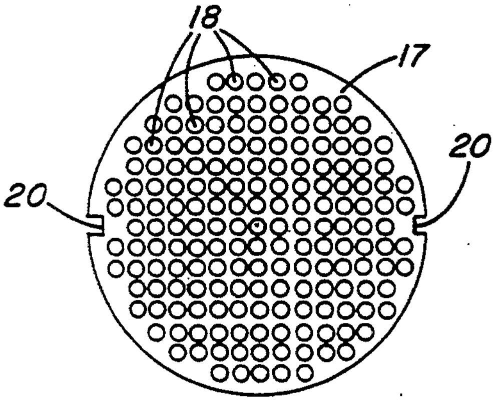
FIG. 4 is a top plan view of the grid of FIG. 2 which supports the solid chemical material charged to the feeder.
Figure 5:
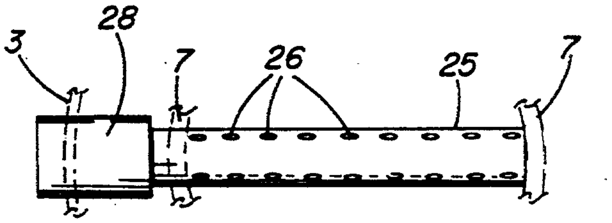
FIG. 5 is a bottom view of pipe means for delivering liquid to the lower inner chamber of the feeder, as shown in FIG. 2.

A chemical feeder of the type described in FIGS. 1 and 2 using the inlet pipe 65 of FIG. 6 was prepared using Schedule 40 poly(vinyl chloride) pipe and 0.5 inch (1.27 cm) poly(vinyl chloride) sheet stock. The nominal diameter of container 6 was 16 inches (40.64 cm) and the nominal diameter of housing 2 was 24 inches (60.96 cm). The internal diameter of chamber 15 was 14.75 inches (37.47 cm). Grid plate 17 was fabricated from 0.5 inch (1.27 cm) poly(vinyl chloride) sheet stock and had a diameter of 14.5 inches (36.83 cm). Grid 17 was machined with 144 holes of 0.75 inch (1.91 cm) diameter drilled on 2 inch (5.08 cm) centers as illustrated in FIG. 4. The side wall 7 of container 6 was drilled with 24 openings 19 having a 1 inch (2.54 cm) diameter spaced evenly around the circumference of container 6 and placed 1.5 inches (3.81 cm) (from the opening centers) above the grid plate 17.

The feeder was placed on a platform balance installed on a scaffold at a height of approximately 5 feet (1.5 meter) adjacent to a 10,000 gallon (37.8 $m^3$) above-ground vinyl-lined pool having the dimensions 12 feet (3.66 meter)×32 feet (9.75 meter)×4 feet (1.22 meter). The feeder inlet was connected to the pressure-side of a Jacuzzi Magnum 2000 (EM-2000) pool pump equipped with a 2-horsepower motor, using a section of 2 inch (5.08 cm) flexible poly(vinyl chloride) hose fitted to a Rotometer flowmeter having a range of 10–130 gallons per minute (0.038–0.492 $m^3$/min) with 2 inch (5.08 cm) inlet and outlet fittings.

The inlet and outlet conduits of the feeder were 2 inch (5.08 cm) and 4 inch (10.16 cm) poly(vinyl chloride) fittings respectively.

The outlet from the feeder was returned to the test pool by gravity through a 4 inch (10.16 cm) rigid poly(-vinyl chloride) pipe. The pump drew water from the pool to the suction side of the pump and forced the water through the flow meter into the feeder.

The feeder was filled with about 100 pounds (45.36 kg) of 3 inch (7.62 cm) calcium hypochlorite tablets produced by PPG Industries, Inc. and having 65% minimum available chlorine in each tablet. The flow rate of water through the feeder was varied from 5 to 95 gallons (0.019–0.360 $m^3$/min) per minute. Weights were recorded before and after the feeder was charged with the calcium hypochlorite tablets, as well as after the desired flow rate had been established and at appropriate intervals throughout the experiment. Delivery rates were calculated from the measured weight losses and time intervals. The data obtained is tabulated in Table 1.

TABLE 1

| Water Flow Rate (gpm) | Chlorine Delivered,* (lb/Hr) | Calcium Hypochlorite Tablets used (lb/Day |
|---|---|---|
| 5** | 1.4 | 52 |
| 10 | 1.4 | 52 |
| 20 | 3.9 | 144 |
| 25 | 6.0 | 222 |
| 35 | 8.5 | 314 |
| 70 | 14.4 | 532 |
| 95 | 20.0 | 738 |

*0.65 × weight loss/time
**A rotometer flowmeter having a range of 0–10 GPM was used for this flowrate.

Although the present invention has been described with reference to specific details of certain preferred embodiments thereof, it is not intended that such details should be regarded as limitations upon the scope of the invention except as to the extent that they are included in the accompanying claims.

What is claimed is:

1. Apparatus for delivering a solution of a solid chemical material, comprising a housing having a base and upwardly extending side walls, said base and side walls defining a cavity, an elongated substantially vertical hollow container within said cavity, said container having side walls, the bottom of which are affixed to said base and which are spaced from the side walls of said housing, plate means connecting the upper terminus of the side walls of the housing to the container, thereby defining a collection chamber between said container and housing, a grid having a plurality of perforations mounted within said container below said plate means, but spaced from and substantially parallel to said base, said grid being in close proximity to the side walls of said container, thereby dividing said container into an upper chamber and a lower chamber, the side wall of said container between said plate means and said grid having a plurality of radially arrayed openings that permit liquid communication between said upper chamber and said collection chamber, means to deliver liquid in which said chemical material is soluble to said lower chamber of said container, and means to remove solution of said chemical material from said collection chamber.

2. The apparatus of claim 1 wherein the side walls of said hollow container extend above the upper terminus of the side walls of the housing and said plate means extends from the upper terminus of the side walls of the housing to the outside side wall of the container.

3. The apparatus of claim 1 wherein said grid is mounted in said container below the midpoint of the vertical axis of said container, thereby dividing said container into a major upper chamber and a minor lower chamber.

4. The apparatus of claim 3 wherein said grid is supported by at least one lip extending horizontally from the inside wall of said container.

5. The apparatus of claim 1, wherein a check valve is in communication with the cavity.

6. The apparatus of claim 5 wherein the check valve is in communication with the collection chamber.

7. The apparatus of claim 1 wherein said means to deliver liquid to said lower chamber comprises an inlet conduit in liquid communication with a sparger pipe extending to and located within said lower chamber.

8. The apparatus of claim 1 wherein said means to deliver liquid to said lower chamber comprises in combination an inlet conduit and baffle means within said lower chamber to distribute liquid entering said chamber substantially uniformly.

9. Apparatus for delivering an aqueous solution of a water-soluble solid chemical material, comprising a housing having a base and upwardly extending side walls, said base and side walls defining a cavity, an elongated substantially vertical hollow container within said cavity, said container having side walls, the bottom of which are affixed to said base, which extend above the upper terminus of the side walls of the housing and which are spaced from the side walls of said housing, plate means secured to and extending from the upper terminus of the side walls of said housing to the side walls of the container, thereby defining an annular collection chamber between said container and housing, a grid having a plurality of perforations mounted within said container below the level of said plate means but spaced from and substantially parallel to said base, said grid being in close proximity to the side walls of said container, thereby dividing said container into an upper chamber and a lower chamber, the side wall of said container between said plate means and said grid having a plurality of radially arrayed openings that permit liquid communication between said upper chamber and said collection chamber, means to deliver water to said lower chamber of said container, and means to remove an aqueous solution of said chemical material from said collection chamber.

10. The apparatus of claim 9 wherein said grid is mounted in said container below the midpoint of the vertical axis of said container, thereby dividing said container into a major upper chamber and a minor lower chamber.

11. The apparatus of claim 9 wherein grid is supported by at least one lip extending horizontally from the inside wall of said container.

12. The apparatus of claim 9 wherein a check valve is in communication with the collection chamber.

13. The apparatus of claim 9 wherein a vacuum relief valve is in communication with the collection chamber.

14. The apparatus of claim 9 wherein said means to deliver water to said lower chamber comprises an inlet conduit in liquid communication with a sparger pipe extending to and located within said lower chamber.

15. The apparatus of claim 9 wherein said means to deliver water to said lower chamber comprises in combination an inlet conduit and baffle means within said lower chamber to distribute water entering said chamber substantially uniformly.

16. The apparatus of claim 9 wherein a check valve and vacuum relief valve are connected to said collection chamber.

17. The apparatus of claim 9 wherein said means to deliver water to said lower chamber comprises, (a) an inlet conduit in liquid communication with a sparger pipe extending to and located within said lower chamber, or (b) in combination an inlet conduit and baffle means within said lower chamber to distribute water entering said lower chamber substantially uniformly.

18. The apparatus of claim 17 wherein the upper terminus of said container has a cover to separate the upper chamber from the outside atmosphere.

19. The apparatus of claim 18 wherein said housing is cylindrical in shape and the container is cylindrical and coaxial with the housing cylinder.

* * * * *